US009539942B2

(12) United States Patent
Salter et al.

(10) Patent No.: US 9,539,942 B2
(45) Date of Patent: Jan. 10, 2017

(54) CUP HOLDER ILLUMINATION

(71) Applicant: Ford Global Technologies, LLC, Dearborn, MI (US)

(72) Inventors: Stuart C. Salter, White Lake, MI (US); James Hadley Muiter, Plymouth, MI (US); Peter Joseph Bejin, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 14/444,279

(22) Filed: Jul. 28, 2014

(65) Prior Publication Data
US 2016/0023594 A1 Jan. 28, 2016

(51) Int. Cl.
*B60Q 1/00* (2006.01)
*B60Q 1/26* (2006.01)
*B60Q 3/02* (2006.01)
*H05B 37/02* (2006.01)

(52) U.S. Cl.
CPC ............ *B60Q 3/0293* (2013.01); *B60Q 3/022* (2013.01); *B60Q 3/0243* (2013.01); *H05B 37/0218* (2013.01); *H05B 37/0227* (2013.01)

(58) Field of Classification Search
CPC ..... B60Q 3/022; B60Q 3/0243; B60Q 3/0293; H05B 37/0218; H05B 37/0227
USPC ........................................................ 362/488
See application file for complete search history.

(56) References Cited

U.S. PATENT DOCUMENTS

| 5,375,805 | A | 12/1994 | Sudak et al. |
| 6,140,934 | A * | 10/2000 | Lam ......................... B60Q 1/50 |
| | | | 340/425.5 |
| 6,337,624 | B1 * | 1/2002 | Nakaho ................... B60R 1/082 |
| | | | 340/475 |
| 6,637,709 | B1 | 10/2003 | Guenther et al. |
| 7,014,336 | B1 * | 3/2006 | Ducharme ......... H05B 33/0857 |
| | | | 362/231 |
| 7,350,757 | B2 | 4/2008 | Baek |
| 7,354,181 | B2 | 4/2008 | Moell |
| 7,585,087 | B2 * | 9/2009 | Gagne ....................... F21S 8/06 |
| | | | 362/221 |
| 7,766,293 | B2 | 8/2010 | Seidl et al. |
| 8,104,295 | B2 | 1/2012 | Lofy |

(Continued)

FOREIGN PATENT DOCUMENTS

WO 2011071891 A1 6/2011
WO 2013023165 2/2013

*Primary Examiner* — Bryon T Gyllstrom
(74) *Attorney, Agent, or Firm* — Vichit Chea; Price Heneveld LLP

(57) ABSTRACT

A method of controlling an ambient light feature of a cup holder assembly having one or more cup holders includes providing a light source having a light output of varying luminous intensity, sensing an amount of light reflected from an object received in one of the cup holders using a light sensor, and controlling the luminous intensity of the light output based on the amount of light reflected and the distance between the object and a sidewall of the cup holder assembly. In this method, a change in the amount of light reflected from an object received in one of the cup holders correlates to a change in the luminous intensity provided by the light source, and a change in the distance between the object received the cup holder and the sidewall of the cup holders correlates to a change in the luminous intensity provided by the light source.

20 Claims, 8 Drawing Sheets

(56) References Cited

U.S. PATENT DOCUMENTS

| | | |
|---|---|---|
| 8,454,181 B2 | 6/2013 | Salter et al. |
| 8,657,245 B2 | 2/2014 | Stangl et al. |
| 2007/0247836 A1* | 10/2007 | Seidl ................ A47C 7/725 362/154 |
| 2009/0175049 A1* | 7/2009 | Lota ................. B60N 3/101 362/488 |
| 2013/0342104 A1 | 12/2013 | Mayer et al. |
| 2014/0104817 A1* | 4/2014 | Foo ................ A47G 23/0216 362/154 |
| 2015/0175065 A1* | 6/2015 | Oh .................. B60N 3/10 362/154 |

\* cited by examiner

CUP HOLDER ILLUMINATION

FIELD OF THE INVENTION

The present invention generally relates to a vehicle cup holder, and more particularly, to a vehicle cup holder with an integrated ambient lighting system that is configured to automatically adjust the amount of ambient light for providing a consistent ambient lighting feature as objects are received and removed from the cup holder. The present invention further includes an automatic temperature control system which is used in conjunction with the ambient lighting system.

BACKGROUND OF THE INVENTION

Vehicle cup holders with integrated ambient lighting systems often provide a fixed amount of ambient light as provided by a light source generally disposed at the bottom of the cup holder or on a sidewall of the cup holder. These lighting features have particular drawbacks when an object is placed in the cup holder. For instance, a solid non-transparent object will generally block a light source disposed at the bottom of the cup holder, and can also block a light source disposed in a sidewall of the cup holder. Further, a transparent object can affect the amount of ambient light produced by a light source when a transparent object is placed in a cup holder. Objects having a reflective surface can also affect the amount of ambient light produced by a cup holder when housed therein. Thus, a cup holder that provides a consistent amount of light is desired regardless of the object housed in the cup holder.

Further, cup holders having a temperature control system have been used in the automotive market, however, the heating or cooling of a beverage container placed in a cup holder is generally provided by a user input on a switch used for controlling the temperature control system. A cup holder that provides an automatic heating or cooling of a beverage container placed in a cup holder well is desired, such that the contents of the beverage container can be maintained at a proper state without user interaction. Further, the automatic temperature control system can be used in conjunction with the ambient lighting system, such that the user can readily ascertain the present mode of the cup holder by various color schemes and light intensities of the ambient lighting system.

SUMMARY OF THE INVENTION

One aspect of the present invention includes a cup holder assembly comprising a housing having at least one cup holder. The cup holder is defined by a bottom wall and an upwardly extending sidewall. The cup holder assembly further includes a lighting system having a light source and a light sensor, wherein the light sensor senses an amount of light reflected from an object received in the cup holder as provided by the light source. The light source of the cup holder assembly provides a light output having a luminous intensity that is relative to the amount of light reflected that is sensed by the light sensor.

Another aspect of the present invention includes a cup holder assembly having a light sensor disposed which is configured to measure a reflectivity of an object received in the cup holder assembly. A light source having a light output of varying luminous intensity is disposed in the cup holder assembly. A controller is communicatively coupled to the light source and the light sensor, and is configured to control the luminous intensity of the light output based on the reflectivity of the object.

Yet another aspect of the present invention includes a method of lighting a cup holder assembly, which includes the step of providing a light source having a light output of varying luminous intensity. The method further includes the step of sensing an amount of light reflected from an object received in the cup holder using a light sensor. The method further includes the step of controlling the luminous intensity of the light output based on the amount of light reflected, wherein a change in the amount of light reflected causes a change in the luminous intensity.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
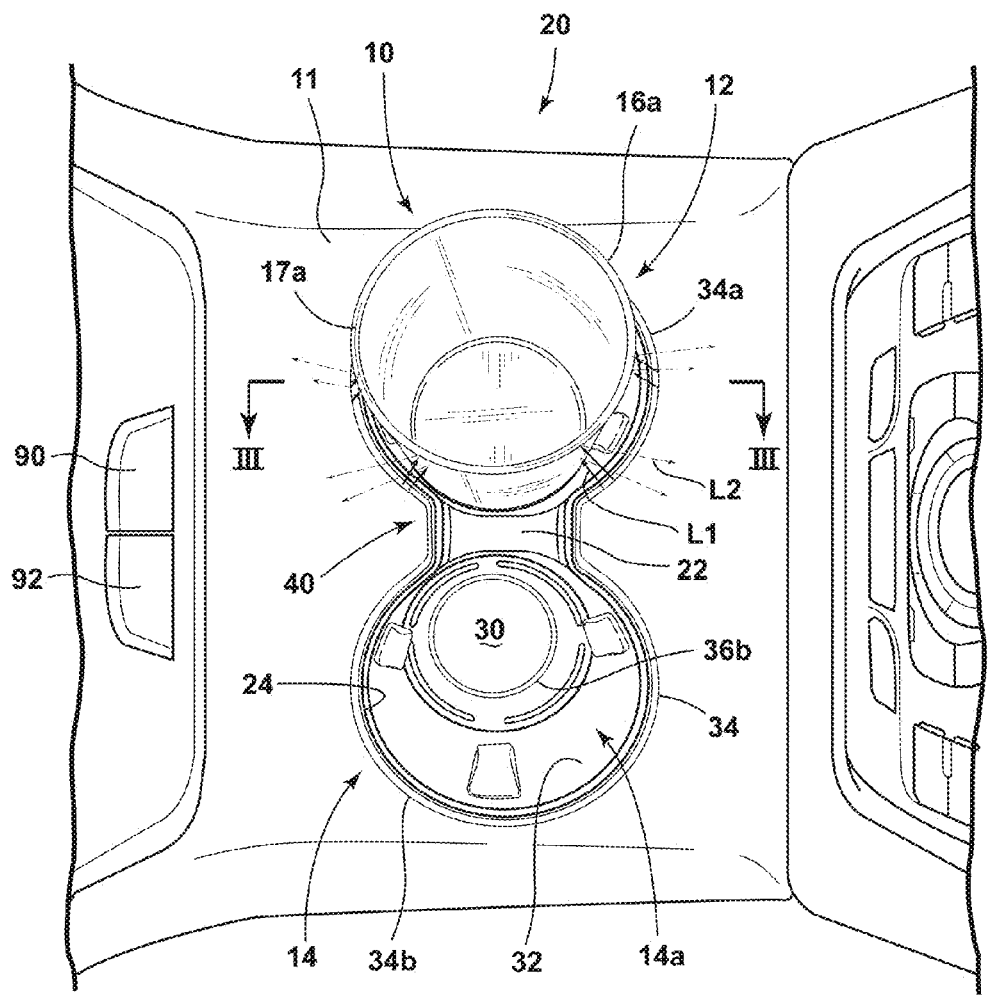
FIG. 1A is a top perspective view of a cup holder assembly of the present invention disposed within a center console and having a beverage container made of a reflective material received therein.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1B:
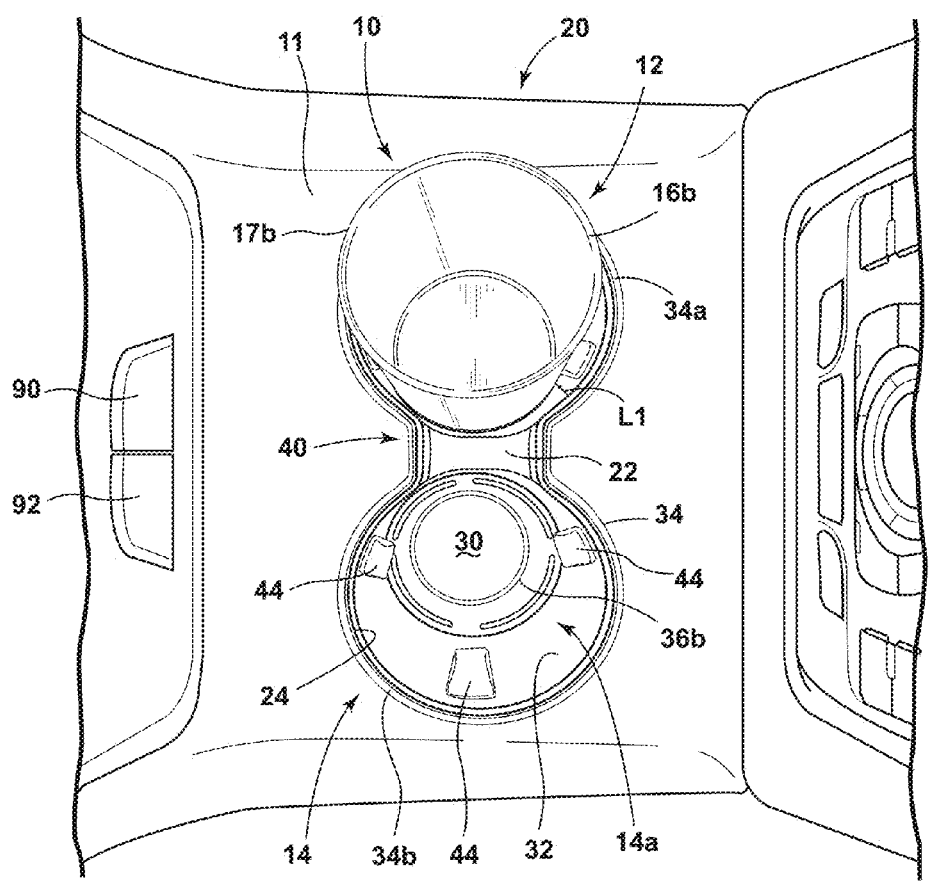
FIG. 1B is a top perspective view of the cup holder assembly of FIG. 1A having a beverage container made of a non-reflective material received therein.

Referring now to FIGS. 1A and 1B, the reference numeral 10 generally designates a cup holder assembly having a housing 11 which includes a first cup holder 12 and a second cup holder 14 which are essentially mirror images of one another having like features. Each cup holder 12, 14 is configured to receive an item, such as a beverage container. In FIG. 1A, beverage container 16a is shown as received in first cup holder 12. The cup holder assembly 10 is generally intended for use inside a vehicle and is exemplarily shown in FIG. 1A located in a vehicle center console 20. However, it should be appreciated that the cup holder assembly 10 may be located in other areas of a vehicle that are viewable and accessible to a vehicle passenger. Further, while the cup holder assembly 10 shown in FIGS. 1A and 1B includes cup holders 12 and 14 of a similar size, it is contemplated that the cup holders 12, 14 may vary in size for accommodating different sized beverage containers or items.

Figure 1C:
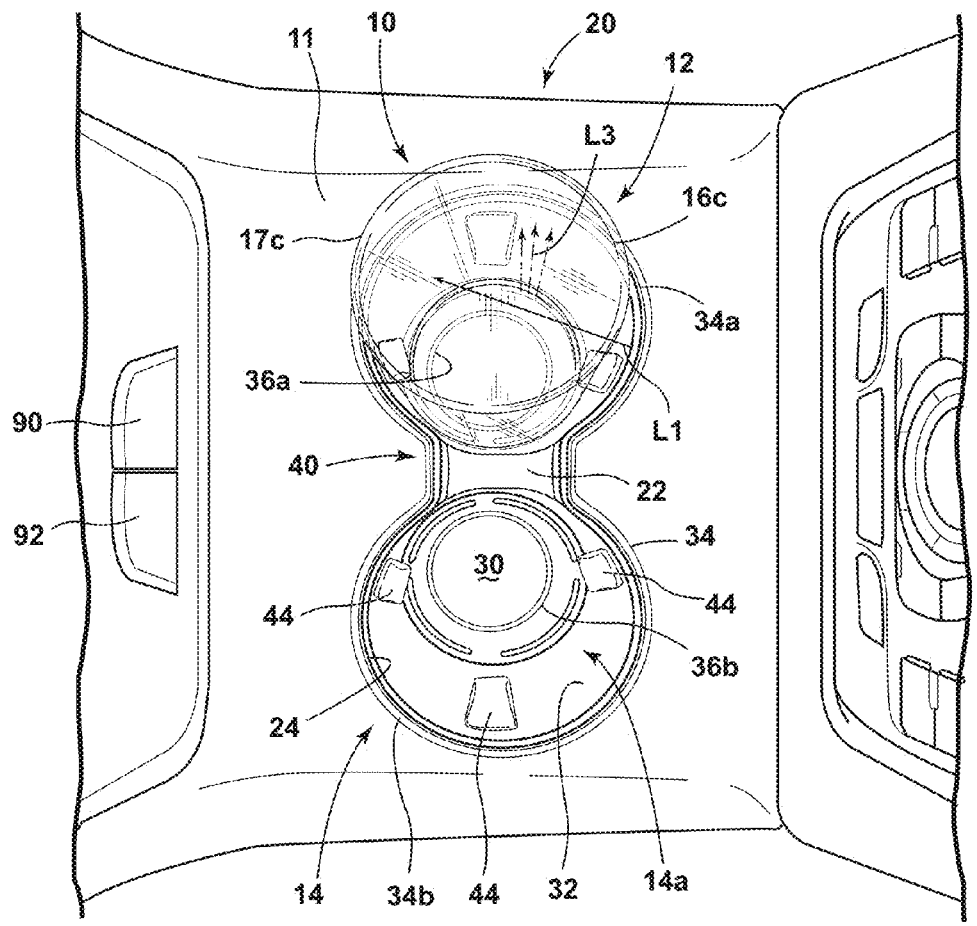
FIG. 1C is a top perspective view of the cup holder assembly of FIG. 1A having a beverage container made of a translucent material received therein.

With reference to FIGS. 1A-1C, the cup holder assembly 10 is shown according to a dual cup holder configuration, but may also be configured to hold a single cup or more than two cups, or may include two or more separated cup holders. The cup holder assembly 10 may be constructed from a rigid or flexible material and may be configured in a variety of shapes, sizes and colors. As noted above, the cup holder assembly 10 includes a first cup holder 12 which is connected to a second cup holder 14 via a channeled intermediate section 22. In this configuration, the first cup holder 12, the second cup holder 14, and the intermediate section 22 collectively define an interior volume of the cup holder assembly 10 having a continuous opening or rim 24 opening into the interior volume of the cup holder assembly 10. With specific reference to the second cup holder 14, each cup holder 12, 14 is generally defined by a bottom wall 30 and a substantially continuous sidewall 32 upwardly extending from the bottom wall 30 to define an interior volume 12a, 14a respectively.

The cup holder assembly 10 further includes a lighting system 40 for providing ambient lighting to the cup holder assembly 10. In the embodiment shown in FIG. 1A, the lighting system 40 includes two separate light sources. The first light source is disposed along the rim 24 of the cup holder assembly 10, and is shown in FIG. 1A as an upper light ring 34. The upper light ring 34 is configured to provide ambient lighting to the cup holder assembly 10. The upper light ring 34 includes first and second sides 34a, 34b which are used to independently light the first and second cup holders 12, 14 respectively, as well as the intermediate section 22. In a configuration where the cup holders 12, 14 are separated, it is contemplated that separate light rings will be used to illuminate each cup holder 12, 14. As a first light source, the upper light ring 34 provides a luminous output that is variable in luminous intensity and that is variable in a coloration scheme of the luminous output as further described below. The first light source, light ring 34, may be in the form of a light pipe or a light guide, a series of light emitting diodes (LEDs), or other like light emitting devices. The upper light ring 34 is configured to provide a substantially even amount of light about the rim 24 of the cup holder assembly 10. The cup holder assembly 10 further includes a second light source in the form of a lower light ring 36b disposed in the bottom wall 30 of second cup holder 14. It is contemplated that another lower light ring is also disposed in the bottom wall of first cup holder 12, however, as shown in FIG. 1A, this bottom wall and lower light ring are covered or concealed by beverage container 16a. It is further contemplated that the lighting system 40 may include more than two light sources that can be single LEDs, other light rings, or any other light emitting devices necessary to properly light the cup holder assembly 10. It is also contemplated that the light sources may be independently controlled per cup holder. Thus, the light sources for the embodiment shown in FIGS. 1A-1C are contemplated to be upper light ring 34 and lower light rings 36a and 36b, shown in FIGS. 1C and 2, wherein the lower light rings 36a, 36b and the first and second sides 34a and 34b of upper light ring 34 all operate independent of one another to provide an even overall lighting output for the cup holder assembly 10.

Thus, as noted above, an object of the present invention is to provide even lighting for the cup holder assembly 10 using the lighting system 40 in all conditions. In order to provide such even lighting, the lighting system 40 of the cup holder assembly 10 adjusts in luminous intensity as a reaction to an item being received in one of the cup holders 12, 14 or both. A degree of \luminous intensity can be increased or decreased as determined by several factors inherent to the object received in the cup holder assembly 10. As further described below, the cup holder assembly 10 may include a plurality of sensors for detecting the presence of an object received in the cup holder assembly 10, the distance or spacing 60 (best shown in FIG. 3) between the detected object and the sidewall 32 of a particular cup holder 12 or 14, the light absorption or reflective characteristics of the detected object, the light transmissive properties of the detected object, as well as the temperature of the detected object. With specific reference to FIG. 1A, the beverage container 16a is contemplated to be a metallic container made of a reflective material, such as metal. Thus, the upper light ring 34, at side 34a, produces a light output L1, indicated with solid lines, that is reflected from the beverage container 16a given the beverage container's metallic outer surface 17a. An amount of light reflected L2 from the beverage container 16a is indicated in FIG. 1A as dashed lines. The amount of light reflected L2 may also be described herein as the reflectivity of the object.

Referring now to FIG. 1B, a beverage container 16b is received in first cup holder 12 that is contemplated to be comprised of a solid light absorbing material having a non-reflective outer surface 17b. Thus, the light output L1 from upper light ring 34 at side 34a is not reflected from the non-reflective outer surface 17b of the beverage container 16b.

Referring now to FIG. 1C, a beverage container 16c is received in first cup holder 12 that is contemplated to be comprised of a transparent or translucent material, such as a substantially clear water bottle having a light transmissive outer surface 17c. Thus, the light output L1 from upper light ring 34 at side 34a is not reflected from the light transmissive outer surface 17c of the beverage container 16c, but rather continues through the outer surface 17c. As further shown in FIG. 1C, the light transmissive outer surface 17c of beverage container 16c allows for light L3 from lower light ring 36a disposed in bottom wall 30 of first cup holder 12 to add to the overall ambient lighting output of the cup holder assembly 10, as this light L3 is not blocked by beverage container 16c as it is with beverage containers 16a and 16b shown in FIGS. 1A and 1B. Thus, in order to provide an even overall ambient lighting output to the cup holder assembly 10, the lighting system 40 must coordinate light output from the various light sources which includes adjusting the luminous intensity, the color of the light emitted and the source of the light emitted. This coordination involves a number of sensors and a controller unit that will now be described.

Figure 2:
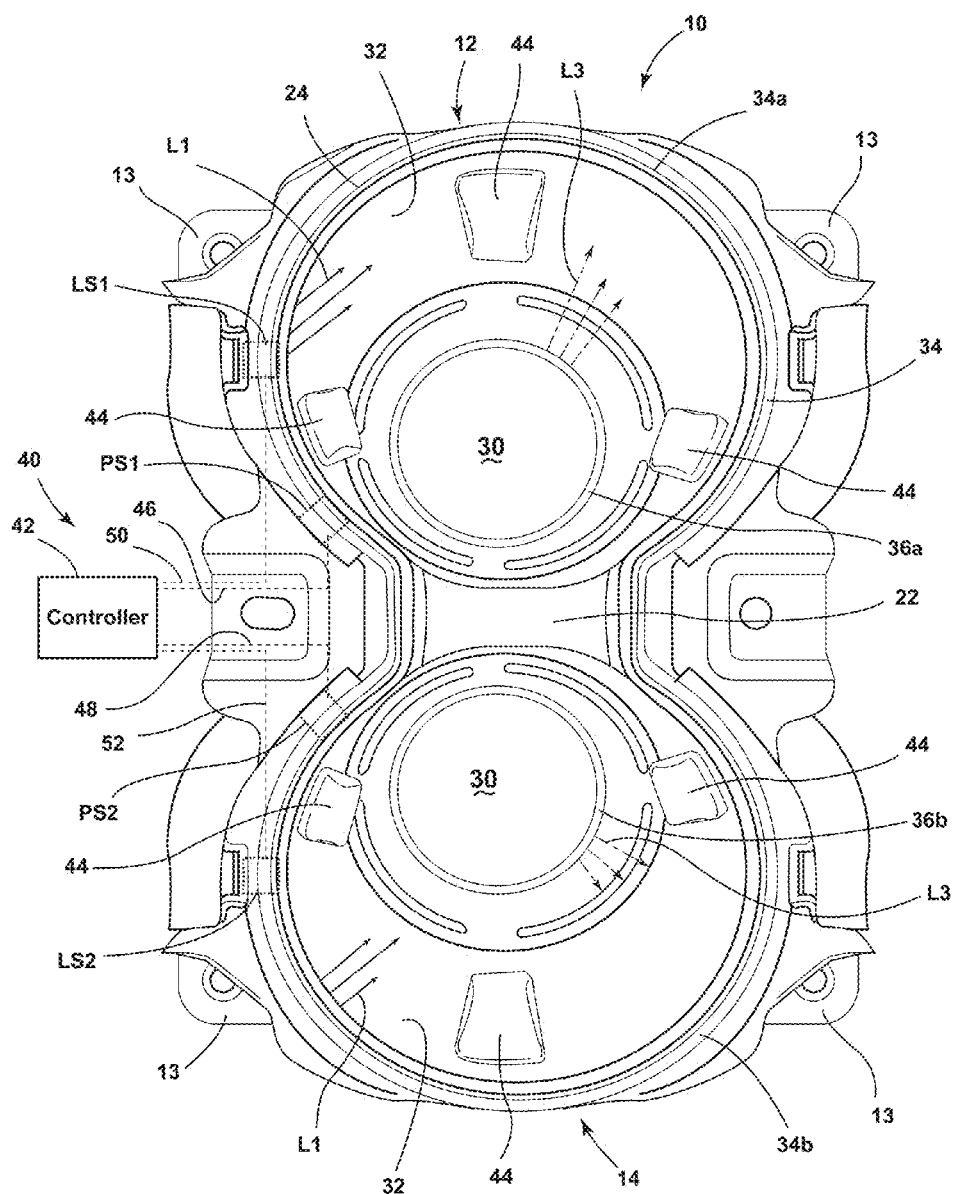
FIG. 2 is a top perspective view of the cup holder assembly of FIG. 1A shown removed from the center console and having one or more sensors associated with the cup holder assembly.

Referring now to FIG. 2, the cup holder assembly 10 is with the housing 11 removed to reveal a plurality of attachment locations 13 for mounting the cup holder assembly 10 to the vehicle console 20 (FIG. 1A). The lighting system 40 is generally shown and includes a plurality of light sources defined in the embodiment of FIG. 2 as the upper light ring 34, having first and second sides 34a, 34b, and lower light rings 36a, 36b. The lighting system further includes a controller 42 which is communicatively coupled to the upper light ring 34 and lower light rings 36a, 36b. In use, the controller 42 is configured to adjust the luminous intensity of light output for the upper light ring 34 and lower light rings 36a, 36b, as well as determine the color of the light output from any one of the light sources.

As shown in FIG. 2, the lighting system 40 also includes a plurality of sensors that are communicatively coupled to the controller 42. The sensors shown in FIG. 2 include light sensor LS1 and proximity sensor PS1 disposed in first cup holder 12, as well as light sensor LS2 and proximity sensor PS2 disposed in second cup holder 14. It is contemplated that while the light sensors LS1, LS2, and the proximity sensors PS1, PS2 are shown in FIG. 2 disposed at or near the rim 24 of the cup holder assembly 10 within each cup holder 12, 14, the sensors LS1, LS2, PS1 and PS2 may also be disposed in the bottom walls 30 or sidewalls 32 of the cup holders 12, 14, or any location within or near the cup holder assembly 10 for proper sensing of the position and reflectivity of an object. It is contemplated that placement of the sensors LS1, LS2, PS1 and PS2 will function best when disposed near the top of the sidewall 32. Further, it is contemplated that any number of sensors can be used to provide the controller 42 with the signal information necessary to properly adjust the overall light output of the lighting system 40, and to maintain an even light output. The proximity sensors PS1 and PS2 may be capacitance sensors, ultrasonic transducers, radio frequency transducers, optical transducers, or electromechanical sensors such as switches in the form of retractable spacers 44 shown in FIG. 2. It is contemplated that the proximity sensors PS1 and PS2 may be integrated into or communicatively coupled to the retractable spacers 44 to sense an amount of deflection of the retractable spacers 44 as an item is received in either cup holder 12, 14. Thus, the proximity sensors PS1 and PS2 are configured to detect the presence of an object received in one of the first and second cup holder 12, 14, and can also sense the distance of the outer surface of the object from the sidewalls 32 of the first and second cup holders 12, 14. This information is sent to the controller as a signal via leads 46, 48 for processing.

The light sensors LS1, LS2 may be spectrophotometers or photo detectors which can provide a variety of information to the controller 42. The light sensors LS1, LS2 are configured to measure an amount of light reflected from an object, or the reflectivity of the object, received in either the first or second cup holder 12, 14. Information from the light sensors LS1, LS2 is transmitted to the controller 42 via signals transmitted through leads 50, 52. For instance, with reference to FIGS. 1A and 2, light sensor LS1 can measure the reflectivity or the amount of light reflected L2 from the outer surface 17a of beverage container 16a. Given that there is an amount of light L1 that is reflected L2, the controller 42 can determine that beverage container 16a is a reflective object, and therefore reduce the luminous intensity of light output L1 from the upper light ring 34 at side 34a. Based on the amount of light reflected L2, the light sensor LS1 can convey information to the controller 42 via a signal through lead 50 that the beverage container 16a is a non-transparent member, such that the controller 42 will recognize that light L3 emitted from the lower light ring 36a will not be shown to a vehicle occupant, and may adjust the luminous intensity of the light output L1 from upper light ring 34 at side 34a to provide an even overall light output for the cup holder assembly 10, as the second cup holder 14 will have both upper light ring 34 at side 34b and lower light ring 36b available for lighting that particular side of the cup holder assembly 10. Thus, when an object is detected in only one cup holder, the empty cup holder may have to increase or decrease luminous intensity and the occupied cup holder may have to increase or decrease luminous intensity to ensure that an even overall light output is achieved. The luminous intensity of any one light source is determined by the controller 42.

With reference to FIGS. 1B and 2, light sensor LS1 will attempt to measure the amount of light reflected from the outer surface 17b of beverage container 16b. Given that there is no amount of light L1 that is reflected, the controller 42 can determine that beverage container 16b is a light absorbing object, and therefore adjust the luminous intensity of light output L1 from the upper light ring 34 at side 34a accordingly. Having no amount of light reflected, the light sensor LS1 can convey information to the controller 42 via a signal through lead 50 that the beverage container is a non-transparent member, such that the controller 42 will recognize that light L3, as shown in FIG. 2, emitted from the lower light ring 36a will not be shown to a vehicle occupant, and therefore may adjust the luminous intensity of the light output L1 from upper light ring 34 at side 34a to provide an even overall light output for the cup holder assembly 10, in a similar manner as described above.

With reference to FIGS. 1C and 2, light sensor LS1 will attempt to measure the amount of light reflected from the outer surface 17c of beverage container 16c. In this embodiment, there is little or no amount of light L1 that is reflected, and the light sensor LS1 will indicate to the controller 42 that beverage container 16b is a transparent or translucent object. Therefore, the luminous intensity of light output L1 from the upper light ring 34 at side 34a will be adjusted by the controller which will take into account that light L3, as shown in FIG. 2, emitted from the lower light ring 36a will contribute to the overall light output. This may call for an increase or decrease in the luminous intensity of either the light output L1 from upper light ring 34 at side 34a, or the light output L3 from the lower light ring 36a to achieve an even overall light output for the cup holder assembly 10 that is evenly distributed from the first and second cup holders 12, 14.

Figure 3:
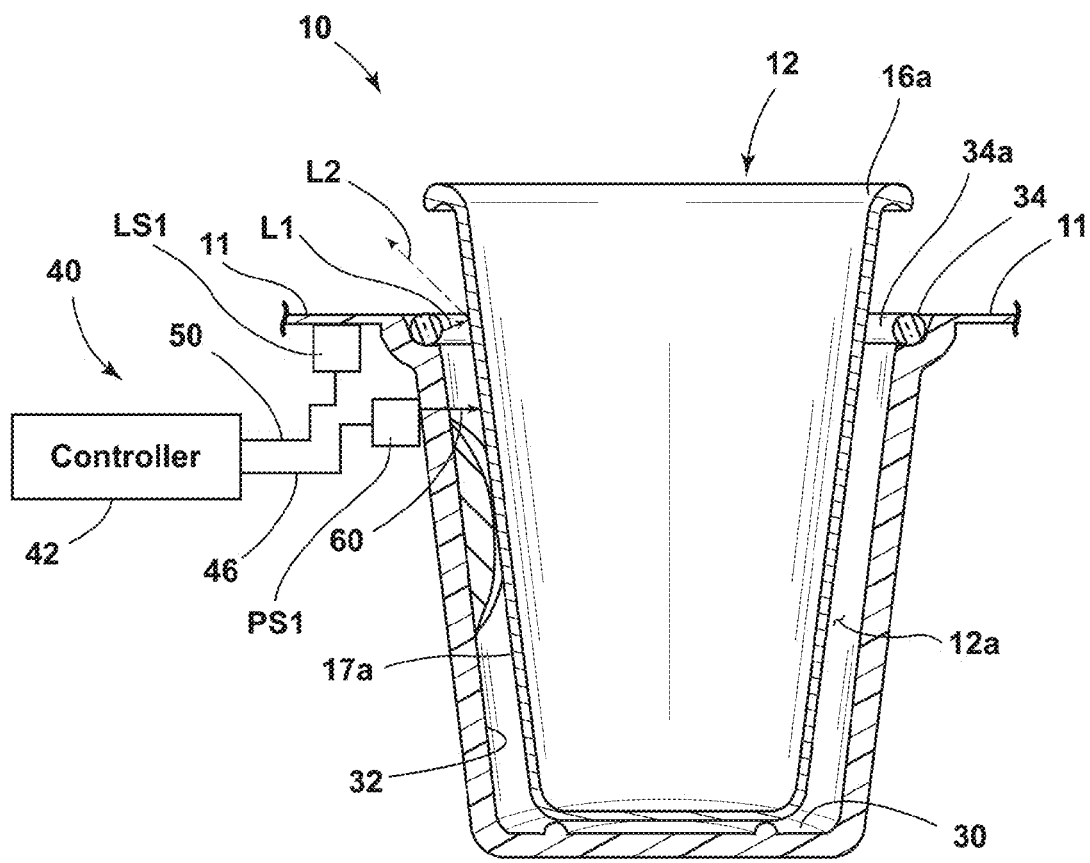
FIG. 3 is a cross sectional view of the cup holder assembly of FIG. 1A taken at line III.

Referring now to FIG. 3, the cup holder assembly 10 is configured to use the proximity sensor PS1 to measure the spacing 60 between the outer surface 17a of beverage container 16a and sidewall 32 of the cup holder 12. The spacing 60 is defined as the gap or distance that exists between sidewall 32 and the outer surface 17a of the beverage container 16a. Variations in the spacing 60 can cause for different overall ambient lighting output. The spacing 60 detected by proximity sensor PS1 is sent to the controller 42 via lead 46 to be factored into the overall lighting output for the cup holder assembly 10. As further shown in FIG. 3, the light sensor LS1 is disposed adjacent to the upper light ring 34 for measuring the amount of light reflected L2 from the metallic outer surface 17a of beverage container 16a. As noted above, the information regarding the amount of light reflected L2 from the beverage container 16a is sent from the light sensor LS1 to the controller 42 via a signal transmitted through lead 50.

Thus, as noted above, the lighting system 40 includes light sources 34, 36a, 36b and light sensors LS1, LS2, as shown in FIG. 2. As described above, the light sensors LS1, LS2 are configured to sense or measure an amount of light reflected L2 (FIG. 1A) from an object 16a received in the cup holder 12. The amount of light reflected L2 is also known as the object's reflectivity. Using signal information provided to the controller 42 from the light sensors LS1, LS2, the light sources 34, 36a, 36b provide an overall light output having a luminous intensity that is relative to or a function of the amount of light reflected L2. That is to say, that the luminous intensity of the overall light output is inversely proportional to the amount of light reflected L2 from the object 16a received in the cup holder 12. Thus, as the amount of light reflected L2 increases, the luminous intensity of the light output decreases, and as the amount of light reflected L2 decreases, the luminous intensity of the light output increases. Further, the lighting system 40 varies in overall light output relative to, or as a function of, the spacing 60 between the object 16a received in the cup holder 12 and the sidewall 32 of the cup holder 12. Thus, it can be said that, the luminous intensity of the light output is inversely proportional to the spacing 60 between the object 16a received in the cup holder 12 and the sidewall 32, such that as the length of the spacing 60 increases, the luminous intensity decreases, and as the length of the spacing 60 decreases, the luminous intensity increases. Thus, the overall light varies in degree of luminous intensity as a function of the amount of light reflected L2, and the spacing 60 between the object 16a received in the cup holder 12 and the sidewall 32 of the cup holder 12.

Figure 4:
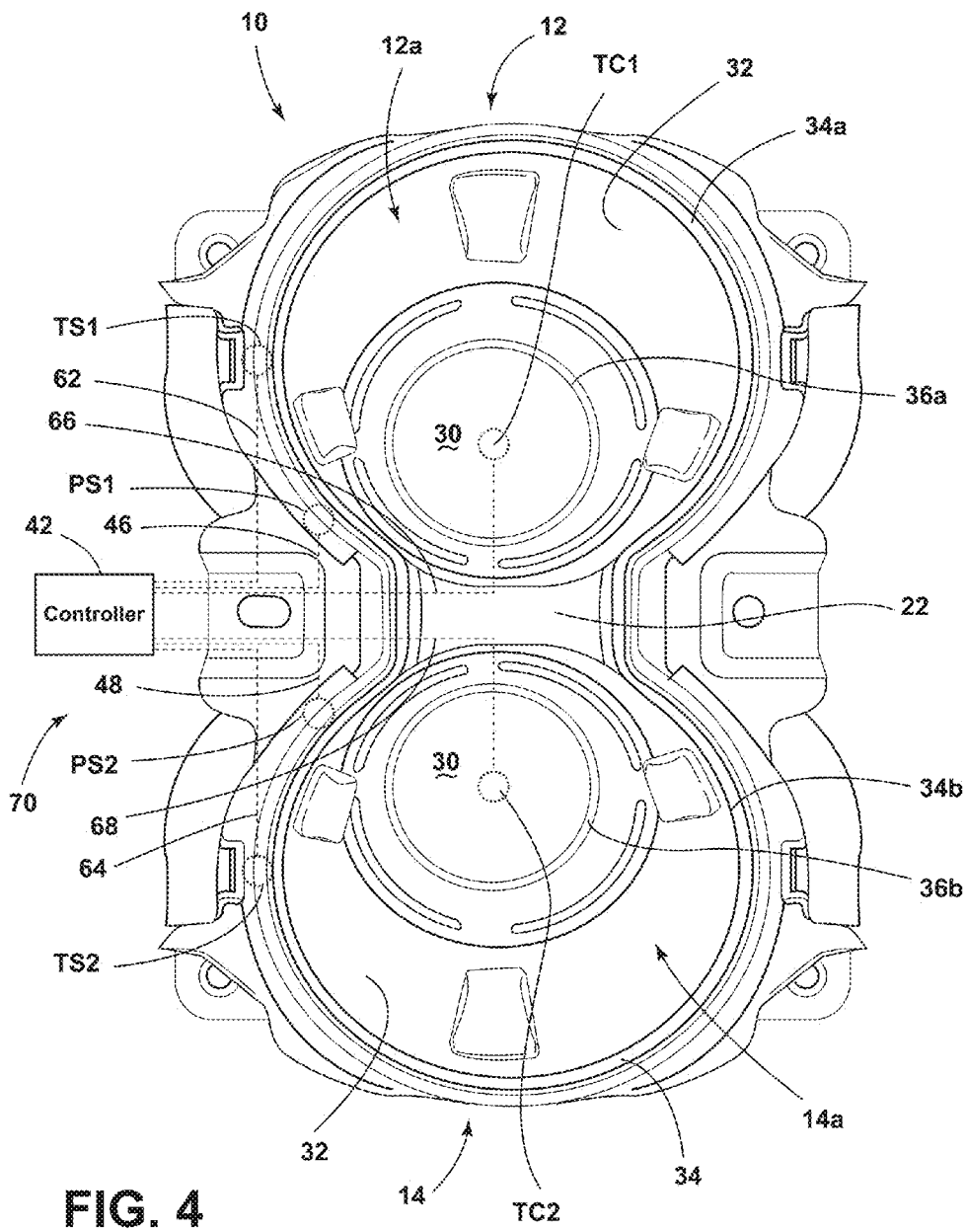
FIG. 4 is a top perspective view of a cup holder assembly of another embodiment having a plurality of sensors and thermal control features.

Referring now to FIG. 4, another embodiment of the cup holder assembly 10 is shown, wherein cup holders 12, 14 remain, but now also include temperature sensors TS1, TS2 and thermal control units TC1, TC2 respectively. In use, the temperature sensors TS1, TS2 are configured to measure the respective temperature of an object received in the interior volumes 12a, 14a of either cup holder 12 or 14. The temperature sensors TS1, TS2, can be sensors using infrared (IR) technology to measure the temperature of a beverage container received in either the first or second cup holder 12, 14, such that no part of the temperature sensors TS1, TS2 need be in actual contact with a beverage container in order to measure its temperature. As shown in FIG. 4, the temperature sensors TS1, TS2 are communicatively coupled to the controller 42 via leads 62, 64 respectively. As further shown in FIG. 4, the thermal control units TC1, TC2 are communicatively coupled to the controller 42 via leads 66, 68 respectively. In the embodiment of FIG. 4, the temperature sensors TS1 and TS2 are shown disposed in the sidewalls 32 of the cup holders 12, 14, but may be situated in any location within or near the cup holder assembly 10 for proper sensing of the temperature of an object received in either cup holder 12, 14. Further, it is contemplated that any number of temperature sensors can be used to provide the controller 42 with the signal information necessary to properly control the thermal control units TC1, TC2 as further described below. In the embodiment of FIG. 4, the thermal control units TC1, TC2 are shown disposed in the bottom walls 30 of the cup holders 12, 14, but may be situated in any location within or near the cup holder assembly 10 for efficient heating and cooling of an object received in either cup holder 12, 14. The thermal control units TC1, TC2 and temperature sensors TS1, TS2 define a temperature control system 70 for the cup holder assembly 10 which, much light the lighting system 40 described above, is communicatively coupled to the controller 42.

Using the temperature sensors TS1 and TS2, the temperature control system 70 of the cup holder assembly 10 is configured to automatically sense if an object received in either cup holder 12, 14 is hot, cold or room temperature. Using the thermal control units TC1, TC2, the temperature control system 70 of the cup holder assembly 10 is further configured to maintain the measured temperature of the object, namely a beverage container, using a variety of algorithms as further described below. Much like the lighting system 40, the temperature control system 70 allows for independent temperature control for the first and second cup holders 12, 14, so that hot and cold beverage containers can be maintained side by side. Further, the temperature control system 70 is contemplated to be in communication with the lighting system 40 through the controller 42, such that ambient light from either the upper light ring 34 or the lower light rings 36a, 36b can emit red or blue to respectively indicate a heating or cooling sequence in either the first or second cup holder 12, 14. In this way, the vehicle occupant can know status of the cup holder assembly 10 at a glance, without any user input.

Items such as soda cans, water bottles or paper coffee cups can easily have their temperature measured using temperature sensors TS1 and TS2 when placed in the cup holders 12, 14. The appropriate heating or cooling mode is then switched on using the thermal control units TC1, TC2 of the temperature control system 70. In this way, the heating or cooling sequence is automatically initiated by a temperature measurement made by the temperature sensors TS1 and TS2 and processed by the controller 42 as an item is received in the cup holder assembly 10. Once the controller 42 has determined the proper thermal control sequence, the thermal control units TC1, TC2 of the temperature control system 70 will initiate the appropriate thermal sequence. Further, the lighting system 40 includes varying coloration for the light sources and will identify a light coloration for light emitted from the various light sources, such as the upper light ring 34 and lower light rings 36a, 36b. It is contemplated that a blue light coloration will be used to indicate a cooling sequence, while a red light coloration will be used to signify a heating sequence. As noted above, the cup holders 12, 14 are independent of one another with regards to temperature and lighting, such that the first cup holder 12 can have a beverage container with a hot liquid contained therein, such that the first cup holder 12 will have a red ambient light emitted L1 from the upper light ring 34 at side 34a. Further, the second cup holder 14 can have a beverage container with a cool liquid contained therein, such that the second cup holder 12 will have a blue ambient light L1 emitted from the upper light ring 34 at side 34b. In this scenario, the first cup holder 12 will be heated by thermal control until TC1, while second cup holder 14 will be cooled by thermal control unit TC2. During daylight hours, it is contemplated that the already existing day/night signal in the vehicle will be used to determine if the red/blue luminous intensity needs to be boosted. Generally a higher level of luminous intensity is needed to make the upper light ring 34 glow properly in daylight. Further, it is contemplated that the upper light ring 34 may be a partially metalized light ring capable of different colorations.

In another embodiment of the present invention, the temperature control system 70 will use the proximity sensors PS1, PS2 to detect the presence of an object received in the cup holders 12, 14. As noted above, the proximity sensors PS1, PS2 can be capacitive proximity detectors, IR proximity detectors, a microswitch disposed in the retractable spacers 44 in the sidewalls 32 of the cup holders 12, 14, or a microswitch disposed in the bottom wall 30 of the cup holders 12, 14. Optionally, the temperature control system 70 can integrate additional remote sensors to improve robustness of detecting insulated beverage containers as received in the cup holders 12, 14. These remote sensors may include a thermal sensor with a view of cup holders 12, 14, such as an IR sensor or a thermal camera used to continuously monitor the temperate of either cup holder 12, 14.

Figure 5:
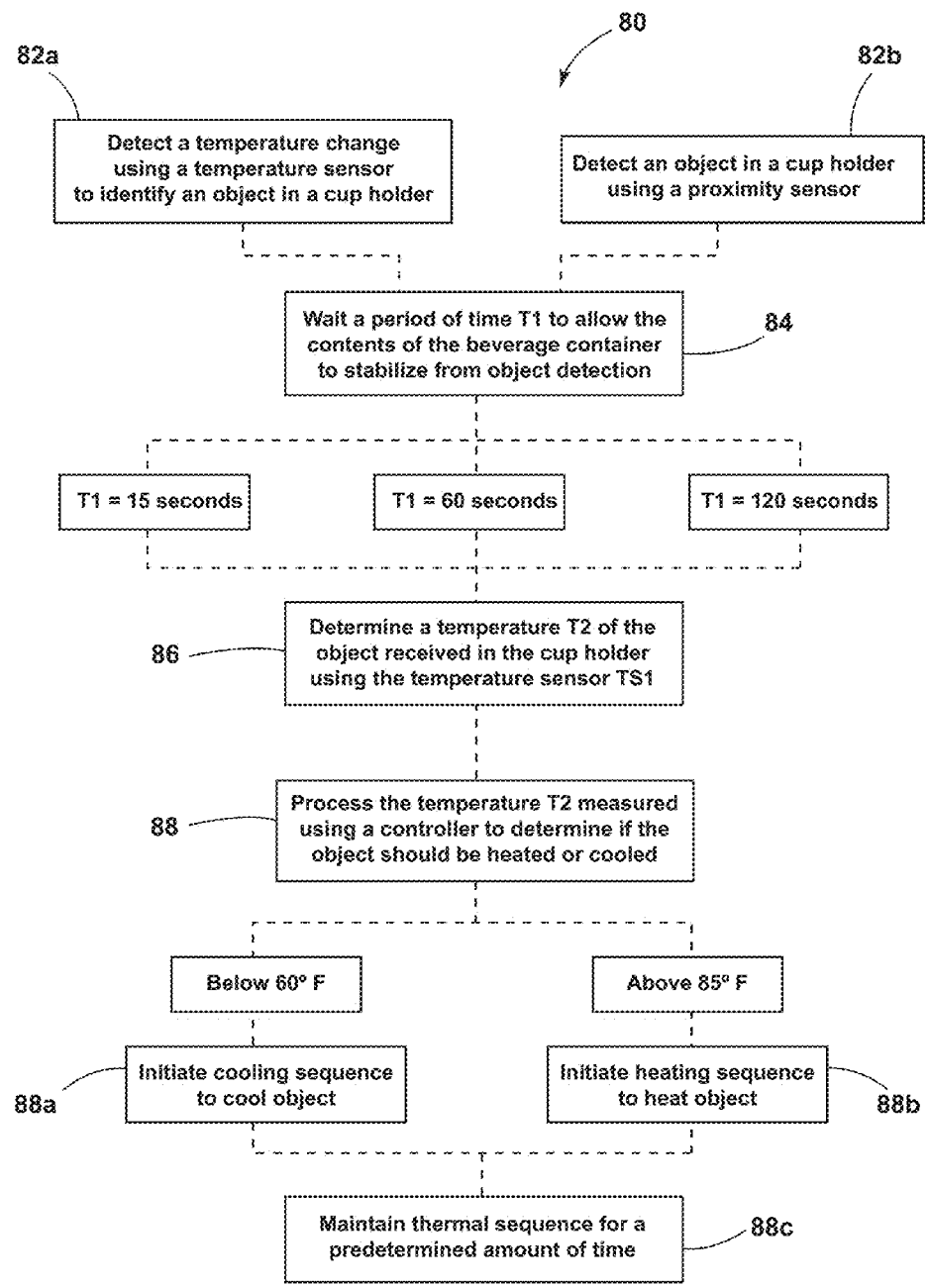
FIG. 5 is a process diagram of an exemplary method controlling the temperature of a cup holder assembly according to another embodiment of the present invention.

With reference to FIG. 5, a first algorithm 80 for the temperature control system 70 will now be described. The object of the first algorithm 80 is to determine if a beverage container is carrying a hot or cold beverage, and based on that determination, adjust the parameters of the temperature control system 70 to maintain the temperature of the beverage. The first algorithm 80 of FIG. 5 will be discussed with reference to the first cup holder 12, although one of ordinary skill will appreciate that the second cup holder 14 can operate in a similar manner.

In a first step 82a of the first algorithm 80, the temperature control system 70 will wait until a temperature change is detected by temperature sensor TS1 disposed in first cup holder 12. A temperature change detected by temperature sensor TS1 will indicate to the controller 42 that an object has been received in the first cup holder 12. In a second step 84, the temperature control system 70 will wait for a period of time T1 to allow the contents of the beverage container to stabilize and to allow the temperature to stabilize after the beverage container is handled by the user. It is contemplated that the time T1 may be about 15 seconds, though other lengths of time may be used as well. In a third step 86, the temperature control system 70 determines a temperature T2 of the object received in the cup holder 12 using temperature sensor TS1. In a fourth step 88, the temperature control system 70 will then process the temperature T2 determined using the controller 42 to determine if the object should be heated or cooled. In the embodiment shown in FIG. 5, the first algorithm 80 has indicated parameters of "below 60° F." and "above 85° F." for determining the proper thermal sequence 88a or 88b, heating or cooling respectively. The temperature control system 70 will then maintain the thermal sequence in a final step 88c. The first algorithm 80 may be initiated by a proximity sensor, such as proximity sensor PS1, identifying the presence of an object in the cup holder 12. It is contemplated that the cup holder assembly 10 will discontinue any thermal sequence when an object has been removed for a predetermined period of time.

It is contemplated that the first algorithm 80 may best be used when a temperature in the cup holder 12 rapidly changes as when either a hot or cold object is placed in the cup holder 12. It is further contemplated that the first algorithm 80 may not be as effective when an insulated beverage container is placed in the cup holder 12. In that case, the time T1 of second step 84 may be extended to about 60 seconds. This amount of time will capture a temperature change even when using an insulated beverage container, as most insulated beverage containers still leak thermally to one degree or another over time, and this leak is detectable. It is further contemplated that the temperature of the car can be taken into account using first algorithm 80. To do so, the temperature control system 70 can use a time T1 of 2 minutes (120 seconds) after an object is placed in the cup holder 12. The controller 42 will then use a look-up table which takes into account a thermal mass of an item, such as an 8 oz cup of coffee or a 12 oz can of soda for example, as well as an ambient temperature of the vehicle for determining if a heating or cooling sequence should be initiated. Further, if the vehicle temperature is less than 50° F. or greater than 90° F. and an object received in the cup holder 12 is between 55° F. and 85° F., then the temperature control system 70 will be used to maintain the object temperature for a cycle of about 20 minutes. In this embodiment, it is assumed that the vehicle temperature is either hot or cold at startup and the beverage container is at room temperature. In this situation, the vehicle occupant will want the beverage container in the cup holder 12 to remain at room temperature, and the temperature control system 70 will work with the thermal control unit TC1 to hold the beverage container at the detected temperature while the vehicle warms up or cools down.

Referring again to FIGS. 1A-1C, the cup holder assembly 10 can be tied to manual switches which allow for manual override of any lighting or temperature control sequence. In FIGS. 1A-1C, switches 90, 92 are contemplated to be tied to the temperature control system 70 and the lighting system 40 to override any light sequence or temperature control sequence that is auto-detected and initiated by the cup holder assembly 10 for either cup holder 12, 14 respectively.

With further reference to the lighting system 40 described above, the overall light output that is emitted by the cup holder assembly 10 needs to vary depending on what type of object is received in the cup holder assembly 10. As noted above with reference to FIG. 1A, a highly reflective object, such as the metal beverage container 16a, will reflect light L2 and if the beverage container 16a fits too tightly within cup holder 12, no light L3 emitted from the lower light ring 36a will get out. So, the closeness of the object to the sidewall 32 of the cup holder 12 is important to controlling the overall light output, which is defined above as spacing 60 shown in FIG. 3. In the present invention, the amount of light L1 emitted from the upper light ring 34 will be determined from a look-up table based on reflectivity of the object and the spacing 60 of the object from the sidewall of the cup holder 12. The look-up table is contemplated to be a table accessed by the controller 42 for determining a value or degree of luminous intensity necessary to provide an even overall light output. The overall light output of the cup holder assembly 10 is designed to be rapidly adjusted when an object is removed or received in either the first or second cup holders 12, 14. When starting a vehicle with a standard key system, the vehicle occupant will generally insert a key and turn the key to a "Key-On-Engine-Off" position. This "Key-On" position generally starts all of the vehicle's electronic systems including interior lights as well as the lighting system 40 of the cup holder assembly 10 of the present invention.

Figure 6:
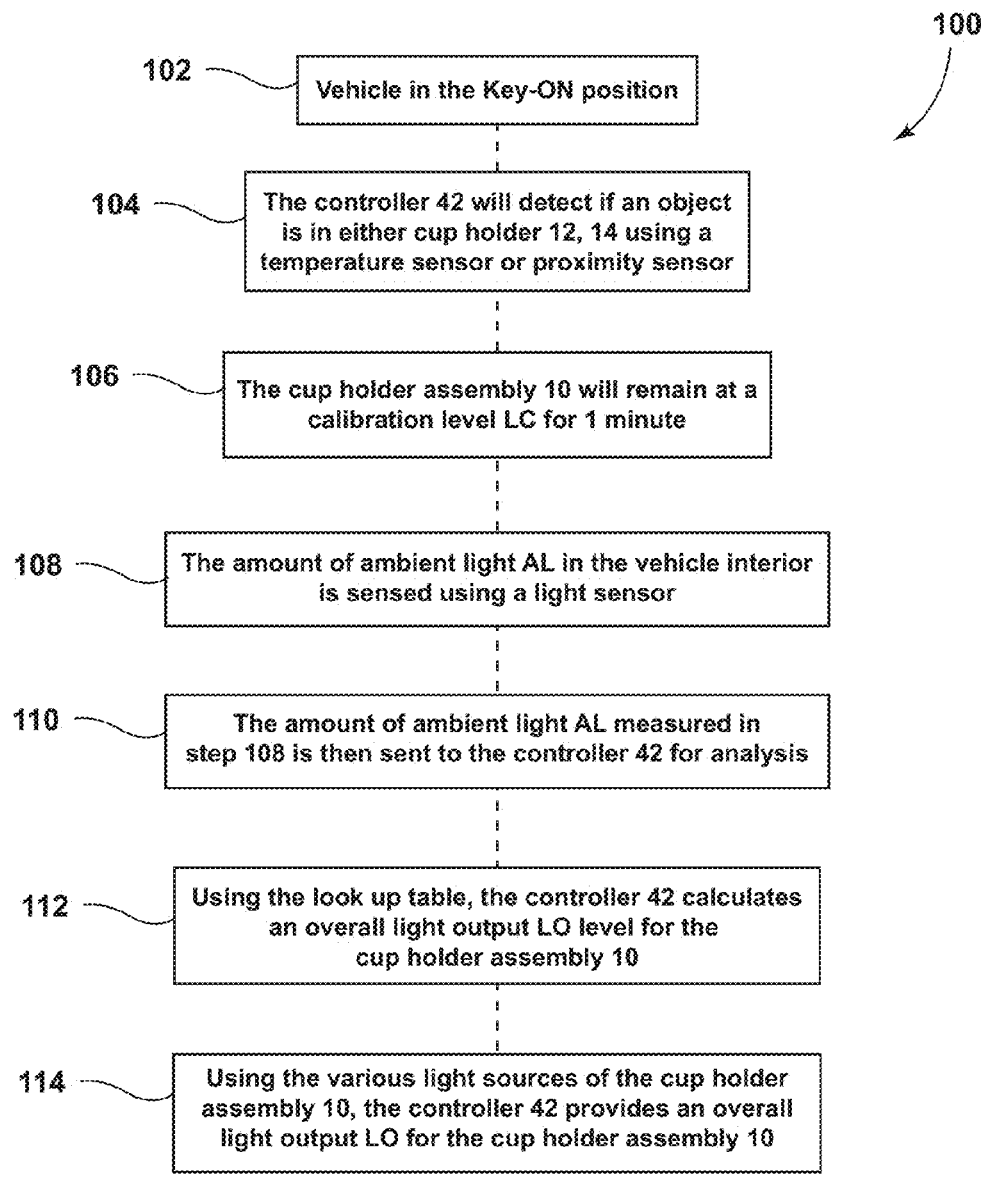
FIG. 6 is a process diagram for calibrating a cup holder assembly for determining an overall ambient light output for the cup holder assembly.

With reference to FIG. 6, a calibration sequence 100 of the cup holder assembly 10 is depicted. With a vehicle in the Key-On position at step 102, the controller 42 will detect if an object is received in either cup holder 12, 14 at step 104. The overall light output LO of the cup holder assembly 10 will remain at a last calibration level LC for 1 minute at step 106. This time duration may vary as needed, but is intended to allow the interior lighting of the vehicle to stabilize. With the vehicle in the Key-On position and the door courtesy signal off, indicating that the vehicle doors are closed, the cup holder assembly 10 is ready to recalibrate. Recalibration should not occur when a vehicle door is open and the vehicle interior lights are on. The interior lighting from a door courtesy signal will bias the recalibration and a recalibration for the cup holder assembly 10 is desired under the driving conditions of the vehicle interior. The recalibration of the cup holder assembly 10 is based on a 1 minute running average with spikes, or peaks in the ambient light sensors, thrown out to prevent random light from biasing the recalibration. Thus, in step 108, an amount of ambient light AL in the vehicle interior is sensed using a light sensor. The amount of ambient light AL measured in step 108 is then sent to the controller 42 for analysis in step 110. Using the look-up table, the controller 42 calculates, or otherwise determines, an overall light output LO level for the cup holder assembly 10 in step 112. Using the various light sources of the cup holder assembly 10, such as upper light ring 34 and lower light rings 36a, 36b shown in FIG. 2, the controller 42 provides an overall light output LO that is contingent on objects received in either cup holder 12, 14, as described above in step 114. As further noted above, the overall light output LO may include varying color configurations and luminous intensities for the cup holders 12, 14 which are independent of one another. In this way, the cup holder assembly 10 of the present invention automatically compensates to provide a more consistent amount of light visible to the vehicle occupant across a variety of beverage containers and other objects received in either cup holder 12, 14.

In some embodiments, the coloration of the upper light ring 34 and the lower light rings 36a and 36b may be controlled by utilizing at least one photoluminescent material to illuminate the cup holders 12, 14. For example, the lower light ring 36b may be configured to output a white light by utilizing two light sources configured to excite a plurality of photoluminescent materials. The lower light ring 36b may receive light emitted from a first light source and a second light source. The first light source is configured to output a first emission of light having a first wavelength and the second light source is configured to output a second emission of light having a second wavelength. Each of the first and second wavelengths may correspond to wavelengths that are in the blue or near UV ranges approximately less than 500 nm. In an exemplary embodiment, the first wavelength may be approximately 480 nm and the second wavelength may be approximately 440 nm.

Each of the first wavelength and the second wavelength from the light sources are configured to excite a photoluminescent material causing a Stoke shift in a light emitted from the lower light ring 36b. In a particular example, the lower light ring 36b may be coated and/or implanted with a first photoluminescent material and a second photoluminescent material. The light emitted from the light sources at the first wavelength and the second wavelength may be transmitted through a body of the lower light ring 36b. Upon emission outward through the outer surface of the lower light ring 36b, the first wavelength and the second wavelength corresponding to the first emission and the second emission may undergo a Stoke shift to output a third emission.

The third emission corresponds to a combination of the wavelengths of light emitted from the lower light ring 36b. In an exemplary embodiment, the third emission may output a significantly white colored light. The white light may be generated by combining the first emission and the second emission in having the substantially blue color with the fluorescence emitted from the first photoluminescent material and the second photoluminescent material. The fluorescence of the first photoluminescent material may correspond to a substantially green light of approximately 526-606 nm, and the fluorescence of the second photoluminescent material may correspond to a substantially red light of approximately 620-750 nm.

The third emission output from the lower light ring 36b may be controlled in coloration by adjusting the intensity of the first and second emissions from the light sources as well as the concentration of the photoluminescent materials implanted and/or coated on the lower light ring 36b. Still referring the present exemplary embodiment, an increase in the concentration of the first photoluminescent material will increase the green component of the third emission. Similarly, an increase in the concentration of the second photoluminescent material will increase the red component of the third emission. Also, by reducing the concentration of the first and second photoluminescent materials, the blue light emitted from light sources will increase. In this configuration, the third emission from the lower light ring 36b may be adjusted to output a wide variety of colorations and hues of light, including the white light described above. Though discussed in reference to the lower light ring 36b alone, the coloration of the upper light ring 34 and lower light ring 36a are contemplated to be configured for use in a similar manner in various embodiments.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A cup holder assembly, comprising:
a housing having at least one cup holder defined by a bottom wall and an upwardly extending sidewall; and
a lighting system having a light ring light source and a light sensor, wherein the light sensor senses an amount of light reflected from an object received in the cup holder,
a controller in communication with the light sensor and the light source to control the light source based on an input from the light sensor; the controller being configured to determine whether a beverage container in the at least one cup holder of the housing reflects light from the light ring light source of the lighting system, determine whether a beverage container in the at least one cup holder of the housing is non-reflective of light from the light ring light source of the lighting system and determine whether a beverage container in the at least one cup holder of the housing is translucent;
and wherein the light ring light source provides a light output having a luminous intensity relative to the amount of light reflected.

2. The cup holder assembly of claim 1, further including:
a proximity sensor configured to measure a spacing between the object received in the cup holder and the sidewall of the cup holder, wherein the luminous intensity of the light output from the light ring light source is adjusted relative to the spacing between the object received in the cup holder and the sidewall of the cup holder.

3. The cup holder assembly of claim 2, wherein the light ring light source includes first and second light sources, wherein the second light source is disposed on the bottom wall of the cup holder.

4. The cup holder assembly of claim 3, wherein the first light source is an upper light ring disposed adjacent to an upper opening of the cup holder, and the second light source is a lower light ring.

5. The cup holder assembly of claim 4, wherein the at least one cup holder includes first and second cup holders, and further wherein the light system independently controls the light output for each of the first and second cup holders.

6. The cup holder assembly of claim 3, wherein the first and second light sources are configured to provide varying coloration of the light output.

7. The cup holder assembly of claim 2, wherein the luminous intensity of the light output is inversely proportional to the amount of light reflected from the object received in the cup holder, such that as the amount of light reflected increases, the luminous intensity decreases, and as the amount of light reflected decreases, the luminous intensity increases.

8. The cup holder assembly of claim 7, wherein the luminous intensity of the light output is inversely proportional to the spacing between the object received in the cup holder and the sidewall, such that as the spacing increases, the luminous intensity decreases, and as the spacing decreases, the luminous intensity increases.

9. The cup holder assembly of claim 2, wherein the controller includes a look-up table for determining the luminous intensity of the light output based on the spacing and the amount of light reflected from the object.

10. A cup holder assembly, comprising:
a light sensor disposed in the cup holder assembly and configured to measure a reflectivity of an object received in the cup holder assembly;
a light ring light source having a light output of varying luminous intensity; and
a controller communicatively coupled to the light source and the light sensor for controlling the luminous intensity of the light output based on the reflectivity of the object;
the controller being configured to determine whether a beverage container in the at least one cup holder of the housing reflects light from the light ring light source of the lighting system, determine whether a beverage container in the at least one cup holder of the housing is non-reflective of light from the light ring light source of the lighting system and determine whether a beverage container in the at least one cup holder of the housing is translucent.

11. The cup holder assembly of claim 10, further including:
a proximity sensor configured to measure a spacing between the object received in the cup holder assembly and a sidewall of the cup holder assembly, wherein the luminous intensity of the light output from the light ring light source is adjusted by the controller relative to the spacing between the object received in the cup holder assembly and the sidewall of the cup holder assembly.

12. The cup holder assembly of claim 11, wherein the controller includes a look-up table for determining a degree of luminous intensity of the light output based on the spacing and the reflectivity of the object.

13. The cup holder assembly of claim 12, wherein the luminous intensity of the light output is inversely proportional to the reflectivity of the object received in the cup holder assembly, such that as the reflectivity increases, the luminous intensity decreases, and as the reflectivity decreases, the luminous intensity increases; and
further wherein the luminous intensity of the light output is inversely proportional to the spacing between the object received in the cup holder assembly and the sidewall, such that as the spacing increases, the luminous intensity decreases, and as the spacing decreases, the luminous intensity increases.

14. A method of lighting a cup holder, comprising the steps of:
providing a light ring light source having a light output of varying luminous intensity;
sensing an amount of light reflected from an object received in the cup holder using a light sensor; and
controlling the luminous intensity of the light output based on the amount of light reflected, wherein a change in the amount of light reflected causes a change in the luminous intensity.

15. The method of claim 14, further including:
sensing a spacing between the object received in the cup holder using a proximity sensor.

16. The method of claim 15, wherein the step of controlling the luminous intensity of the light output further includes deriving a luminous intensity value from a look-up table of a controller, the luminous intensity value being a function of the spacing and the amount of light reflected.

17. The method of claim 16, wherein the step of providing a light ring light source further includes providing a first light source and a second light source, wherein the second light source is disposed in a bottom wall of the cup holder.

18. The method of claim 17, wherein the step of sensing an amount of light reflected from an object received in the cup holder further includes determining if the object is a reflective object, a light absorbing object or a translucent object.

19. The method of claim 18, wherein the step of controlling the luminous intensity of the light output further includes using the first and second light sources to provide an overall light output.

20. The method of claim 19, wherein the step of controlling the luminous intensity of the light output further includes decreasing the luminous intensity as the amount of light reflected increases, and increasing the luminous intensity as the amount of light reflected decreases; and further wherein the step of controlling the luminous intensity of the light output further includes decreasing the luminous intensity as the spacing increases, and increasing the luminous intensity as the spacing decreases.

* * * * *